US008926464B2

(12) United States Patent
Garabello et al.

(10) Patent No.: US 8,926,464 B2
(45) Date of Patent: Jan. 6, 2015

(54) HYBRID POWERTRAIN UNIT FOR MOTOR VEHICLES

(71) Applicant: C.R.F. Societa Consortile per Azioni, Orbassano (IT)

(72) Inventors: Marco Garabello, Turin (IT); Andrea Piazza, Turin (IT)

(73) Assignee: C.R.F. Società Consortile per Azioni, Orbassano (Turin) (IT)

( * ) Notice: Subject to any disclaimer, the term of this patent is extended or adjusted under 35 U.S.C. 154(b) by 0 days.

(21) Appl. No.: 14/085,457

(22) Filed: Nov. 20, 2013

(65) Prior Publication Data
US 2014/0221143 A1  Aug. 7, 2014

(30) Foreign Application Priority Data

Feb. 4, 2013  (EP) .................................... 13153802

(51) Int. Cl.
B60K 6/50    (2007.10)
B60K 6/387   (2007.10)
B60K 6/48    (2007.10)
B60K 1/04    (2006.01)

(52) U.S. Cl.
CPC . B60K 6/50 (2013.01); B60K 6/387 (2013.01); B60K 6/48 (2013.01); B60Y 2400/404 (2013.01); B60K 2001/0411 (2013.01); B60K 2006/4808 (2013.01); B60Y 2400/4244 (2013.01); Y10S 903/902 (2013.01)
USPC ............................................. 475/5; 903/902

(58) Field of Classification Search
USPC .............................................. 475/9, 200, 206
See application file for complete search history.

(56) References Cited

U.S. PATENT DOCUMENTS 6,719,654 B2 * 4/2004 Deichl et al. ...................... 475/5
7,278,943 B2 * 10/2007 Puiu ................................. 475/86
2002/0065163 A1  5/2002 Deichl et al.

FOREIGN PATENT DOCUMENTS

DE  10 2010 051124 A1  5/2011
DE  10 2009 056366 A1  6/2011
EP       1 067 002 A1    1/2001
EP          1529957 A1  11/2005
EP       1 868 832 B1    7/2009
GB          2452063 A    2/2009
WO      2013007886 A1    1/2013

OTHER PUBLICATIONS

European Search Report for corresponding European Application No. 13153802.7 completed on Jun. 12, 2013.

* cited by examiner

Primary Examiner — Robert A Siconolfi
Assistant Examiner — Huan Le
(74) Attorney, Agent, or Firm — Heslin Rothenberg Farley & Mesiti P.C.; Victor A. Cardona, Esq.

(57) ABSTRACT

A hybrid powertrain unit includes an internal-combustion engine, and a gearbox device with a primary shaft that can be connected to the shaft of the internal-combustion engine via a clutch device. The gearbox device includes a secondary shaft with an output pinion meshing with a first crown wheel of a differential, the casing of which is rigidly connected to the casing of the gearbox device. An electrical machine is designed to function as electric motor and as electric generator, having a shaft connected by a transmission to a second crown wheel of the differential. An engagement device driven via an electronic control actuator is set between the shaft of the electrical machine and the second crown wheel. The electrical machine can be set coaxially to the output shafts of the differential or parallel thereto. Alternatively, the shaft of the electrical machine may be connected to the shaft of the internal-combustion engine by means of a belt transmission and engagement device.

18 Claims, 4 Drawing Sheets

HYBRID POWERTRAIN UNIT FOR MOTOR VEHICLES

CROSS REFERENCE TO RELATED APPLICATIONS

This application claims priority to European Patent Application No. EP 13153802.7 filed on Feb. 4, 2013, the entire disclosure of which is incorporated herein by reference.

FIELD OF THE INVENTION

The present invention relates to a hybrid powertrain unit for motor vehicles, of the type comprising:
- an internal-combustion engine; and
- a gearbox device including:
  - at least one primary shaft that can be connected to the crankshaft of the motor vehicle by means of a clutch device;
  - at least one secondary shaft, the axis of which is parallel and set at a distance from the axis of said primary shaft, and which carries an output pinion;
  - a plurality of pairs of gears corresponding to a plurality of forward gear ratios, in which the gears of each pair are rigidly connected in rotation with respect to one between said primary shaft and said secondary shaft, and the other is freely rotatable with respect to the other of said primary and secondary shafts; and
  - a plurality of gear-selection devices for coupling in rotation each of said freely rotatable gears with the shaft on which it is mounted, said unit further comprising:
- a differential, having a first crown wheel meshing with said output pinion of said secondary shaft of the gearbox device; and
- an electrical machine designed to operate both as electric motor and as electric generator, and having a casing rigidly connected to the casing of said differential, and a shaft connected by means of a transmission to a second crown wheel of said differential.

A hybrid powertrain unit of the type referred to above is known, for example, from the document No. EP 1 868 832 B1.

OBJECT OF THE INVENTION

The object of the present invention is to provide a hybrid powertrain unit of the type specified above that will have a simple structure and small overall dimensions and that will be efficient, reliable, and versatile in operation.

With a view to achieving the above purpose, the subject of the invention is a hybrid powertrain unit having all the characteristics indicated at the start of the present description and moreover characterized in that it further comprises:
- an engagement device interposed in said transmission for connection between the shaft of the electrical machine and the aforesaid second crown wheel of the differential; and
- means for actuating said engagement device.

In a preferred embodiment, the engagement device is a clutch device, and the actuator means associated thereto comprise an electromagnetic or electrohydraulic actuator and an electronic control unit for controlling said actuator.

The invention may be implemented both in a first embodiment, in which the electrical machine has a shaft sharing the axes of the two output shafts of the differential, and in a second embodiment, in which the electrical machine has a shaft having its axis parallel and set at a distance from the axes of the two output shafts of the differential. In the first case, the shaft of the electric motor is a hollow shaft that traverses the engine and is traversed by one of the two output shafts of the differential.

In both of the embodiments it may moreover be envisaged, according to the invention, that the shaft of the electrical machine is corrected to the shaft of the internal-combustion engine at the end of the latter opposite to the one connected to the gearbox device. Preferably, said connection is obtained by means of a belt transmission, including an endless belt engaged on a first pulley and a second pulley, which are carried, respectively, by the shaft of the electrical machine and by the shaft of the internal-combustion engine. Once again preferably, set between one of the two aforesaid pulleys and the respective shaft is an engagement device, for example, an electromagnetically controlled one.

Thanks to the aforesaid characteristics, the powertrain unit according to the invention may advantageously be used in front-wheel-drive motor vehicles, even of small dimensions. Use of the engagement device in the connection between the differential and the electrical machine enables said connection to be made in the operating conditions in which this is desired, to the advantage of efficiency of the system.

Activation of engagement is controlled by the electronic control unit of the motor vehicle according to a pre-set program, as a function of the operating parameters of the engine and of the motor vehicle. The same applies to coupling of the belt connection between the electrical machine and the shaft of the internal-combustion engine, in the embodiment where this is envisaged.

BRIEF DESCRIPTION OF THE FIGURES

Further characteristics and advantages of the invention will emerge from the ensuing description with reference to the annexed drawings, which are provided purely by way of non-limiting example and in which.

DETAILED DESCRIPTION OF THE INVENTION

Figure 1:
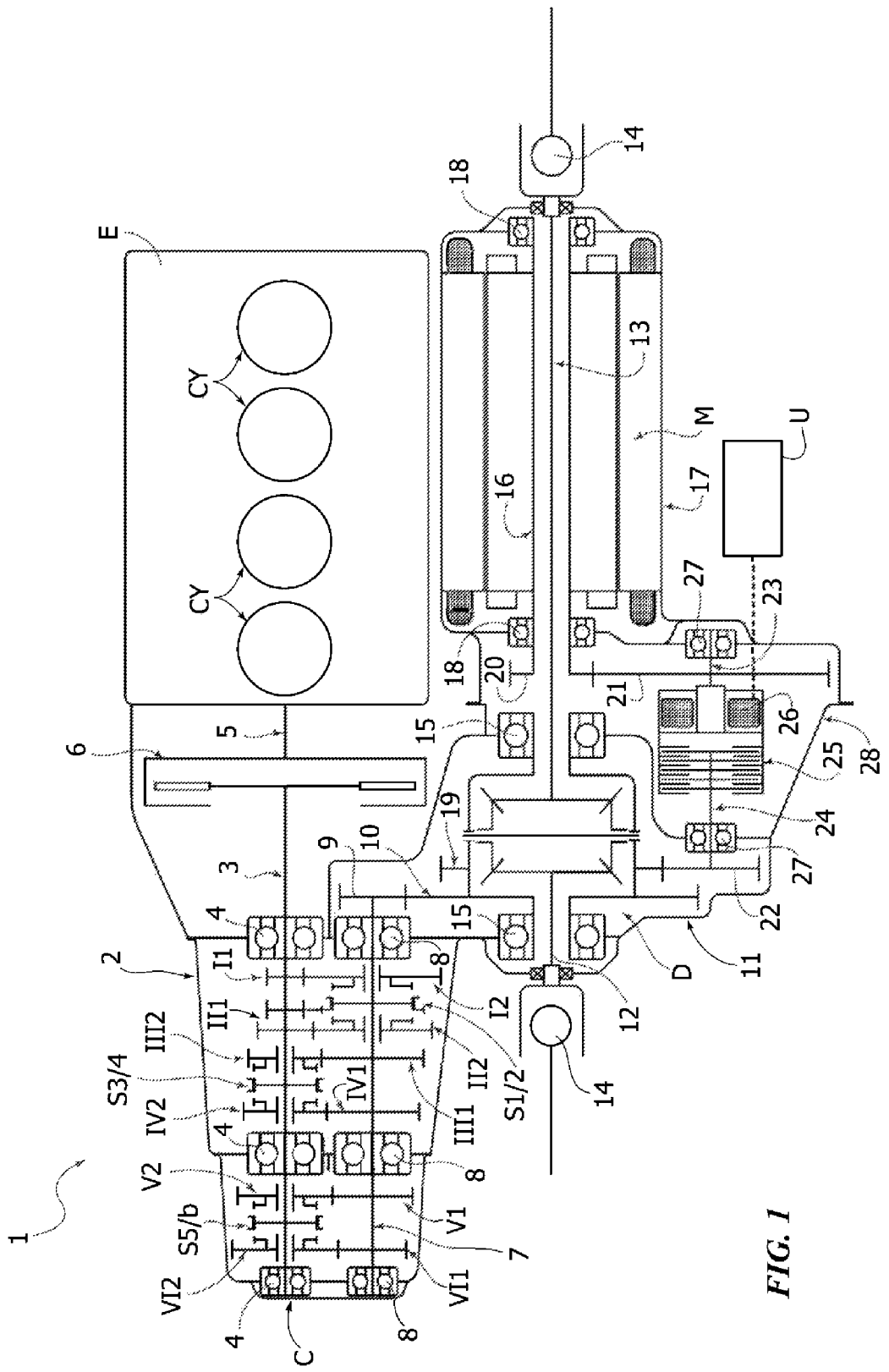
FIG. 1 is a schematic view of a first embodiment of the powertrain unit according to the invention.

In FIGS. 1-4, parts in common are designated by the same reference numbers. In said figures, number 1 designates as a whole a hybrid powertrain unit for motor vehicles, comprising an internal-combustion engine E, a gearbox device C, a differential D, and an electrical machine M.

According to the conventional art, the gearbox device C has a casing 2, rotatably mounted inside which is a primary shaft 3 by means of rolling bearings 4. The primary shaft can be connected to the shaft 5 of the engine E via a clutch device 6 of any known type. Moreover, rotatably mounted inside the casing 2 of the gearbox C, via rolling bearings 8, is a secondary shaft 7. The axis of the secondary shaft 7 is parallel to and set at a distance from the axis of the primary shaft 3.

Of course, even though the annexed drawings show a gearbox of the conventional type, which includes a single primary shaft and a single secondary shaft, the invention applies to any other known configuration of the gearbox device, including, in particular, the configurations that envisage two coaxial primary shafts that can be connected selectively to the crankshaft by means of a double-clutch device and have any number of secondary shafts.

To return to the configuration illustrated in the drawings by way of example, the primary shaft 3 and the secondary shaft 7 carry pairs of gears meshing together to provide a plurality of forward gear ratios. One gear of each pair is rigidly connected to the shaft by which it is carried, whereas the other gear of each pair is mounted freely rotatable on the respective shaft.

In the case of the example illustrated, the first gear ratio is obtained by a pair of gears including a gear I1 rigidly connected to the primary shaft 3 and a gear I2 mounted freely rotatable on the secondary shaft 7, The second gear ratio is obtained by means of a gear II1 rigidly connected to the primary shaft 3 and a gear II2 mounted freely rotatable on the secondary shaft 7. The third, fourth, fifth, and sixth gear ratios are obtained by means of pairs of gears including gears III1, IV1, V1, VI1 rigidly connected to the secondary shaft 7 and corresponding gears III2, IV2, V2 and VI2 mounted freely rotatable on the primary shaft 3.

Once again according to the known art, the primary and secondary shafts 3, 7 carry selection devices S1/2, S3/4 and S5/6 for connecting selectively in rotation each of the freely rotatable gears I2, II2, III2, IV2, V2, VI2 to the respective shafts on which they are carried.

The gearbox device C further comprises a third shaft (not visible in the plate of drawings), which carries in a freely rotatable way a reverse gear and a selection device for connecting said gear in rotation to the respective shaft in such a way as to transmit the motion of rotation of the primary shaft 3 to the secondary shaft 7 with a reversal of the direction of rotation.

The secondary shaft 7 carries an output pinion 9 meshing with a first crown wheel 10 of the differential D. The differential D, which has a structure of a type in itself known, has a casing 11 rigidly connected to the casing 2 of the gearbox device C and has two output shafts 12, 13 for transmitting the motion to the gears of the motor vehicle via constant-velocity universal joints 14. The crown wheel 10 is rigidly connected to the gear-train carrier of the differential, which is rotatably mounted within the casing 11 by means of bearings 15.

The electrical machine M is designed to function both as electric motor and as electric generator, according to the operating conditions. In the embodiment illustrated in FIG. 1, the electrical machine M shares the axes of the two output shafts 12, 13 of the differential D and is axially traversed by its shaft, designated by 16. The shaft 16 is hollow and is In turn axially traversed by the output shaft 13 of the differential D so as to enable aligned arrangement of the electrical machine M with the differential D. The casing 17 of the electrical machine M is rigidly connected to the casing 11 of the differential D and possibly also to the structure of the internal-combustion engine E. The shaft 16 of the electrical machine M is rotatably supported within the casing 17 via rolling bearings 18.

The shaft 16 of the electrical machine M is connected in rotation to a second crown wheel 19 of the differential D rigidly connected to the gear-train carrier of the differential. In the case of FIG. 1, the connection between the shaft 16 of the electrical machine M and the crown wheel 19 of the differential D is obtained by a double gear-reduction jump, obtained by means of a first pair of gears 20, 21 and a second pair of gears 22, 19. The gear 20 is rigidly connected to the shaft 16 of the electrical machine M, whereas the gears 21, 22 are carried by two shafts 23, 24 aligned with one another, which can be connected by means of an engagement device 25, which, in the case of the example illustrated, is a clutch device controlled by an electromagnetic actuator 26, which is in turn driven by an electronic control unit U (illustrated schematically only in FIG. 1). The actuator could also be of an electrohydraulic type, or of any other known type. Also the engagement device could be of any other known type. The two shafts 23, 24 are rotatably mounted via rolling bearings 27 within a casing 28 of the gear-reduction transmission, which is rigidly connected to the casing 11 of the differential D and with the casing 17 of the electrical machine M.

With reference to the specific example illustrated, the engagement device 25 and the electromagnetic actuator 26 may be obtained in any known way. For these reasons, the constructional details of said elements are not illustrated herein, also in order to render the drawings simpler and of easier to understand.

Finally, with reference to FIGS. 1-4, it may be noted that designated as a whole by CY are the cylinders of the engine that are set vertically in the condition where the unit is mounted on the motor vehicle. Consequently, the views illustrated in FIGS. 1-4 are top plan views, with reference to the arrangement where the powertrain unit is mounted in the motor vehicle. Typically, the unit is mounted in the front part of the motor vehicle, in association with the front wheels of the motor vehicle.

In operation, the electrical machine M functions as electric motor or as generator, according to the operating conditions of the engine and of the motor vehicle. In particular, the following different modalities of operation are possible:

electrical drive (internal-combustion engine E turned off and gearbox in neutral)

hybrid drive (internal-combustion engine turned on and gearbox with a gear engaged), recovery of energy during braking (internal-combustion engine turned on and gear in neutral or else clutch 6 between the internal-combustion engine and gearbox disengaged).

The electrical machine M may moreover be used as electric motor for filling the gap in the torque supplied by the internal-combustion engine to the wheels of the vehicle during gear change.

Finally, the engagement device 25 enables decoupling of the electrical machine M in the operating conditions in which intervention thereof is not required.

Figure 2:
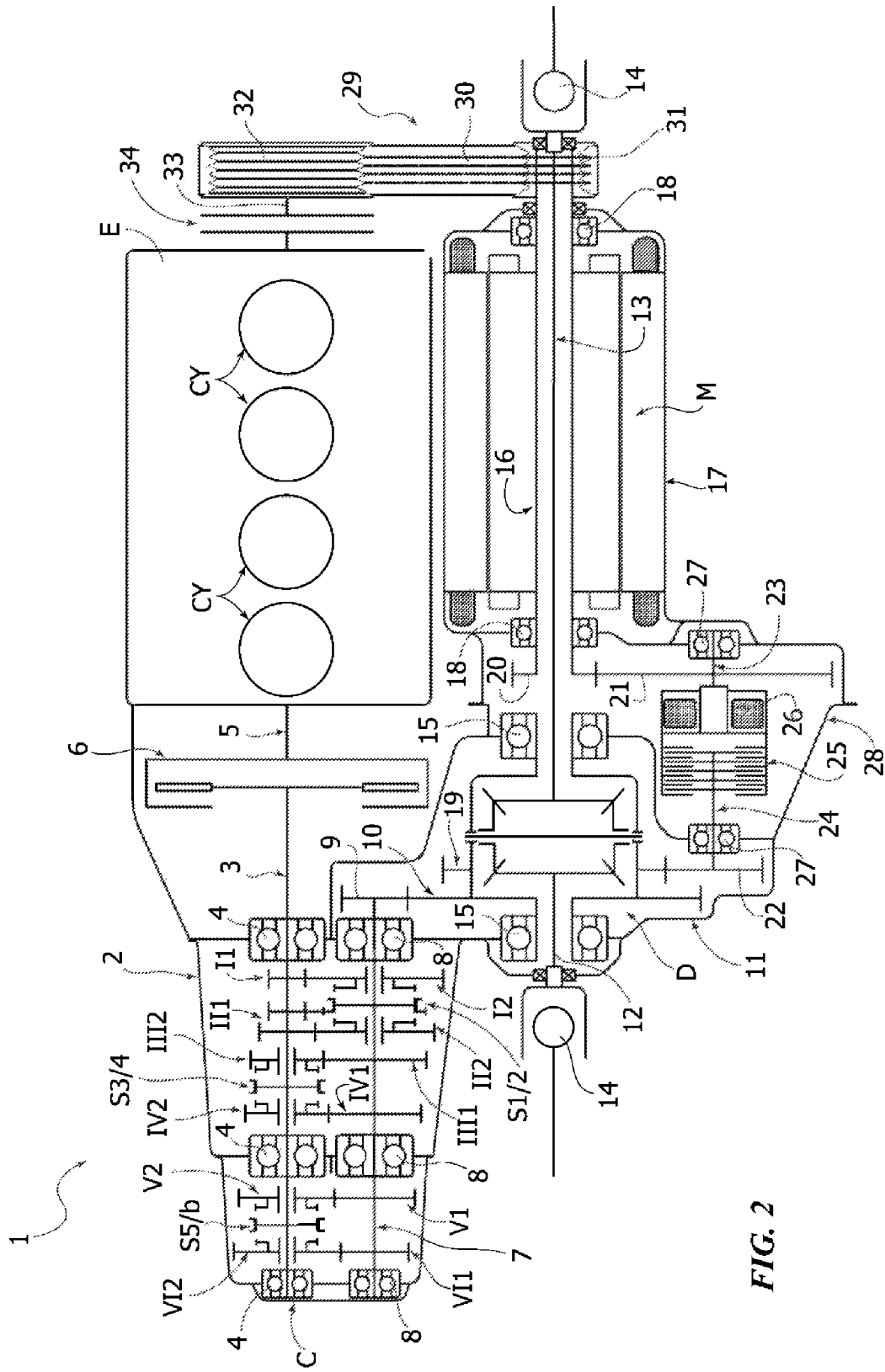
FIG. 2 is a schematic view of a variant of the powertrain unit of FIG. 1.

The variant of FIG. 2 differs from the embodiment of FIG. 1 in that in addition there is provided a direct connection of the shaft 16 of the electrical machine M to the shaft 5 of the internal-combustion engine E, at the end of the engine E opposite to the one connected to the gearbox device C. For this purpose, a belt transmission 29 is provided, including an endless belt 30 engaged on a first pulley 31 carried by the shaft 16 of the electrical machine M and on a second pulley 32 carried by the shaft 33 that can be connected to the shaft 5 of the internal-combustion engine via an engagement device 34, for example, an electromagnetically governed one or one of any other known type. An engagement device of this type is, tor example, described and illustrated in the document No. EP 1 529 957 A1 filed in the name of the present applicant.

The belt transmission 29 and the engagement device 34 enable direct connection of the shaft of the internal-combustion engine to the shaft of the electrical machine M to provide, for example, a function of the electrical machine as BAS ("Belt Alternator Starter"), i.e., as a generator driven by the engine or as electric motor for starting the internal-combustion engine.

In the modalities for starting the internal-combustion engine, the engagement device 25 is disengaged and the engagement device 34 is engaged.

In the modalities of generation of current with the vehicle standing still, the internal-combustion engine is turned on, the engagement device 25 is disengaged, and the engagement device 34 is engaged.

In vehicles equipped with a stop-and-go device, in which the internal-combustion engine turns off automatically when the vehicle is stationary, the electrical machine M makes it possible to keep auxiliary devices governed by the belt 30 functioning (such as the compressor of the air-conditioning system). In this condition, the engagement device 34 is disengaged.

Figure 3:
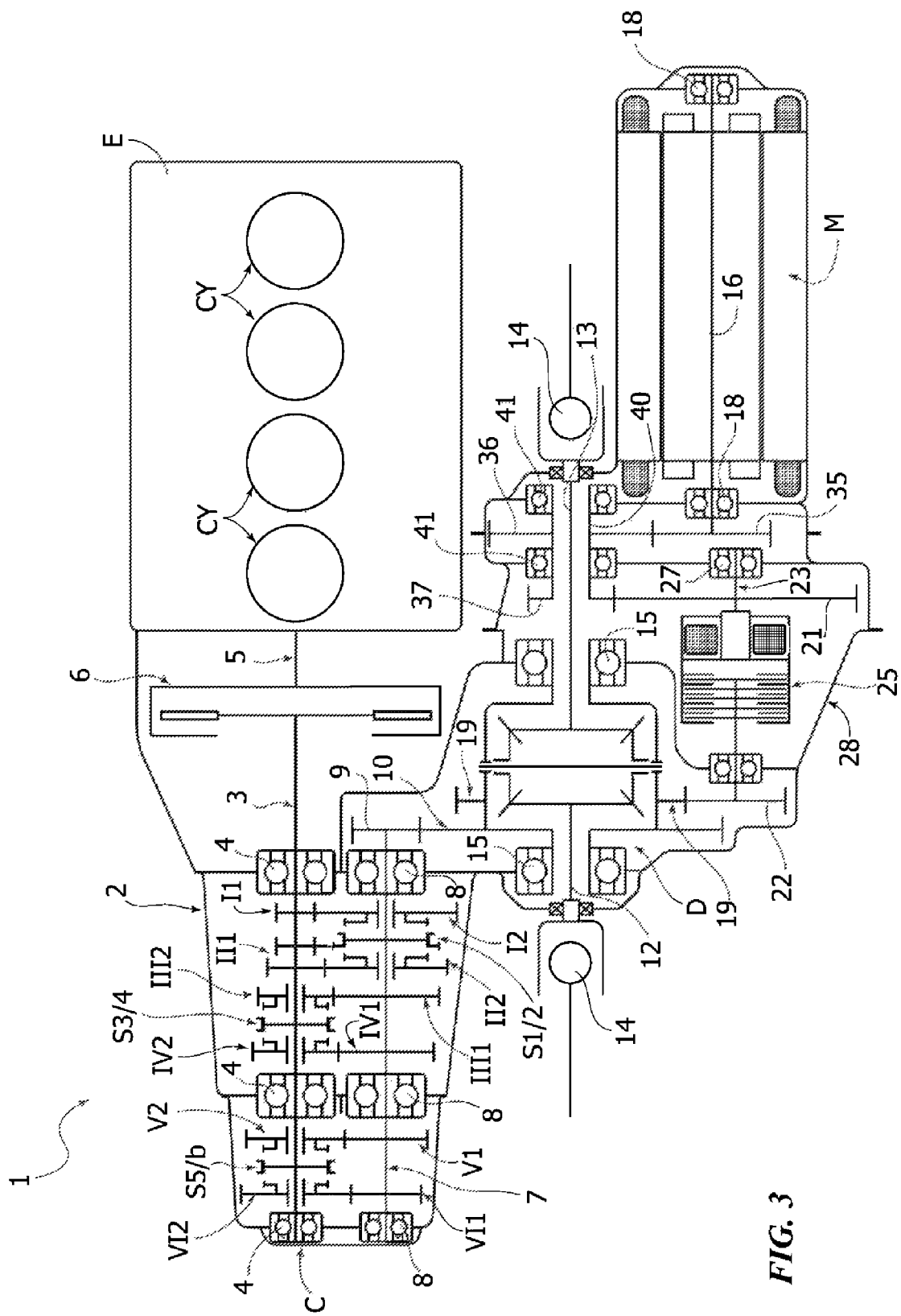
FIG. 3 is a schematic view of a second embodiment of the powertrain unit according to the invention.

FIG. 3 illustrates a second embodiment that differs from the first embodiment of FIG. 1 in that the electrical machine M has its axis set parallel to and at a distance from the axes of the output shafts 12, 33 of the differential D. In this case, the connection between the shaft 16 of the electrical machine M and the second crown wheel 19 of the differential D is obtained by means of three gear-reduction jumps. A first jump is obtained by means of the pair of gears 35, 36. A second jump is obtained by means of the pair of gears 37, 21, and a third jump is obtained by means of the pair of gears 22, 19. The gears 36, 37 are carried by a hollow shaft 40 that is mounted freely rotatable within the casing 28 via rolling bearings 41. The hollow shaft 40 is traversed by the output shaft 13 of the differential D. In the embodiment of FIG. 3, the gears 21, 22 are arranged as described with reference to FIG. 1, in association with shafts 23, 24 that can be connected together by means of the electromagnetically governed engagement device 25.

Figure 4:
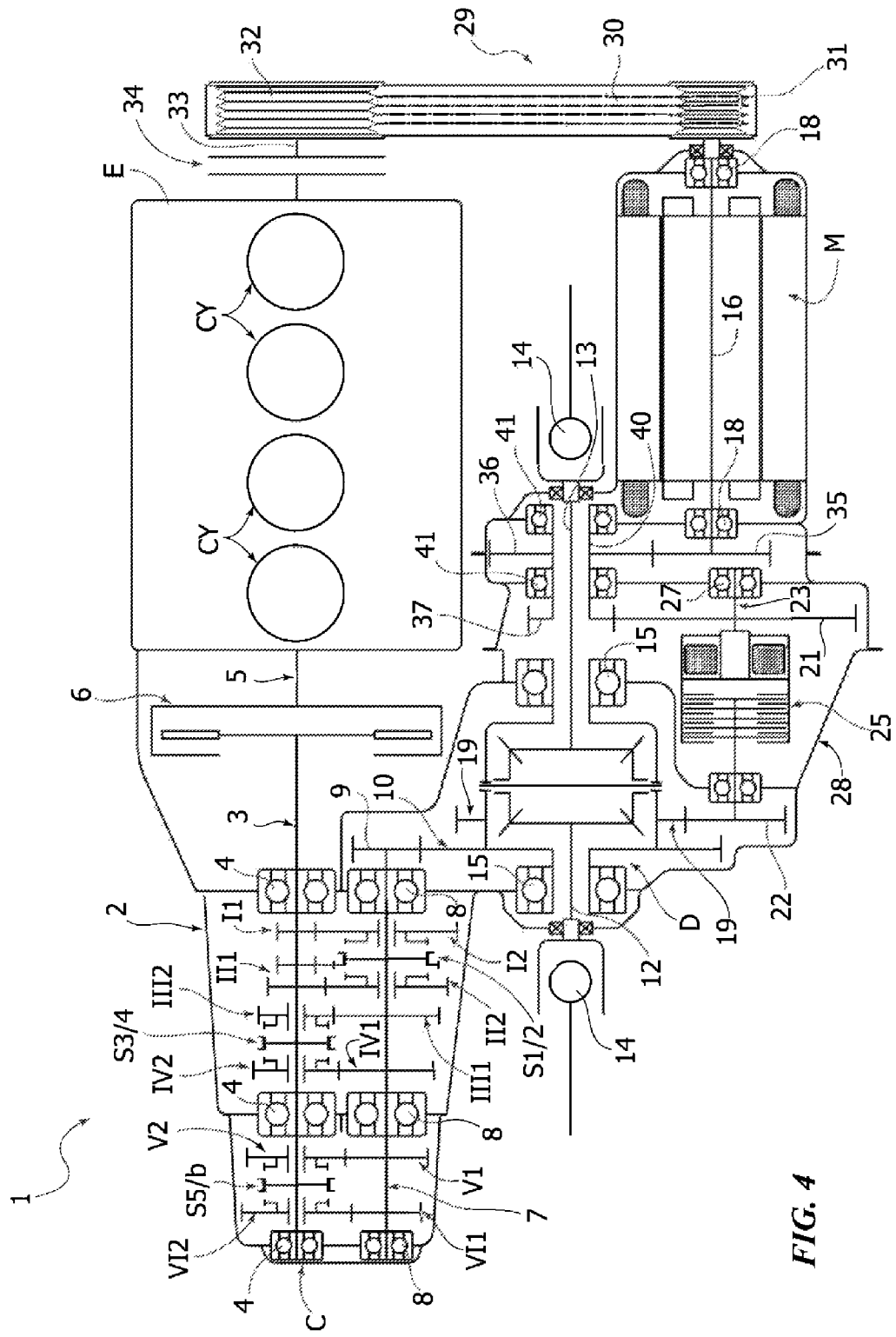
FIG. 4 is a variant of the embodiment illustrated in FIG. 3.

Finally, FIG. 4 is a variant of the embodiment of FIG. 3 that differs from by this in that it includes the belt connection 29 that has been illustrated above with reference to FIG. 2.

Of course, without prejudice to the principle of the invention, the details of construction and the embodiments may vary widely with respect to what has been described and illustrated herein purely by way of example, without thereby departing from the scope of the present invention.

What is claimed is:

1. A hybrid powertrain unit for a motor vehicle, comprising:
    an internal-combustion engine; and
    a gearbox device including:
        at least one primary shaft, that can be connected to a crankshaft of the motor vehicle by means of a clutch device,
        at least one secondary shaft comprising an axis parallel to and at a distance from an axis of said primary shaft, said at least one secondary shaft carrying an output pinion;
        a plurality of pairs of gears corresponding to a plurality of forward gear ratios, in which a first gear of each pair is rigidly connected in rotation with respect to a first shaft of said primary and secondary shafts and a second gear of each pair is mounted freely rotatable on a second shaft of said primary and secondary shafts; and
        a plurality of gear-selection devices for coupling in rotation each of said freely rotatable gears with the second shaft on which is mounted,
    a differential, having a first crown wheel meshing with said output pinion of said secondary shaft of the gearbox device;
    an electrical machine designed to operate both as an electric motor and as an electrical generator and having a casing rigidly connected to a casing of said differential, and a shaft connected by a transmission to a second crown wheel of said differential;
    an engagement device set in said transmission for connection between a shaft of the electrical machine and the second crown wheel of the differential;
    an actuator for actuating said engagement device; and
    the shaft of the electrical machine sharing axes of two output shafts of the differential.

2. The unit according to claim 1, wherein the electrical machine has a shaft connected to a shaft of the internal-combustion engine at a second end of the internal-combustion engine opposite to a first end of the engine connected to the gearbox device.

3. The unit according to claim 1, wherein said engagement device is a clutch device, and the actuator means comprise an electromagnetic or electrohydraulic actuator and an electronic unit for controlling said actuator.

4. The unit according to claim 3, wherein the electrical machine has a shaft connected to a shaft of the internal-combustion engine at a second end of the engine opposite to a first end of the engine connected to the gearbox device.

5. The unit according to claim 1, wherein said transmission for connection comprises two gear-reduction jumps obtained by means of two pairs of gears, and an output gear at output from a first gear-reduction jump of the two gear-reduction jumps and an input gear at input in a second gear-reduction jump of the two gear-reduction jumps are mounted on shafts aligned with one another, said shafts connectable by said engagement device.

6. The unit according to claim 5, wherein the electrical machine has a shaft connected to a shaft of the internal-combustion engine at a second end of the engine opposite to a first end of the engine connected to the gearbox device.

7. The unit according to claim 1, wherein said shaft of said electrical machine traverses axially said electrical machine and is a hollow shaft, which is in turn traversed by one of said two output shafts of said differential.

8. The unit according to claim 7, wherein the electrical machine has a shaft connected to a shaft of the internal-combustion engine at a second end of the engine opposite a first end of the engine connected to the gearbox device.

9. The unit according to claim 1, wherein the electrical machine has a shaft having an axis parallel to and at a distance from the axes of the two output shafts of the differential.

10. The unit according to claim 9, wherein said transmission for connection includes three gear-reduction jumps obtained a first pair of gears, a second pair of gears, and a third pair of gears, an output gear at output from the first gear-reduction jump and an input gear at input to the second gear-reduction jump are rigidly connected to a hollow shaft mounted so that said hollow shaft shares the axes of the two output shafts of the differential and is axially traversed by one of said output shafts of the differential, and the output gear from the second gear-reduction jump and the input gear to the third gear-reduction jump are connected in rotation to two shafts that are aligned with one another and connectable together by said engagement device.

11. The unit according to claim 9, wherein the electrical machine has a shaft connected to the shaft of the internal-combustion engine at a second end of the engine opposite to a first end of the engine connected to the gearbox device.

12. A hybrid powertrain unit for a motor vehicle, comprising:
- an internal-combustion engine; and
- a gearbox device including:
  - at least one primary shaft, that can be connected to a crankshaft of the motor vehicle by means of a clutch device,
  - at least one secondary shaft comprising an axis parallel to and at a distance from an axis of said primary shaft, said at least one secondary shaft carrying an output pinion;
  - a plurality of pairs of gears corresponding to a plurality of forward gear ratios, in which a first gear of each pair is rigidly connected in rotation with respect to a first shaft of said primary and secondary shafts and a second gear of each pair is mounted freely rotatable on a second shaft of said primary and secondary shafts; and
  - a plurality of gear-selection devices for coupling in rotation each of said freely rotatable gears with the second shaft on which is mounted,
- a differential, having a first crown wheel meshing with said output pinion of said secondary shaft of the gearbox device;
- an electrical machine designed to operate both as an electric motor and as an electrical generator and having a casing rigidly connected to a casing of said differential, and a shaft connected by means of a transmission to a second crown wheel of said differential;
- an engagement device set in said transmission for connection between a shaft of the electrical machine and the second crown wheel of the differential;
- an actuator for actuating said engagement device;
- the electrical machine comprising a shaft having an axis parallel to and at a distance from the axes of the two output shafts of the differential; and
- said transmission for connection including three gear-reduction jumps obtained by means of a first pair of gears, a second pair of gears, and a third pair of gears, an output gear at output from the first gear-reduction jump and an input gear at input to the second gear-reduction jump are rigidly connected to a hollow shaft mounted so that said hollow shaft shares the axes of the two output shafts of the differential and is axially traversed by one of said output shafts of the differential, and the output gear from the second gear-reduction jump and the input gear to the third gear-reduction jump are connected in rotation to two shafts that are aligned with one another and connectible together by said engagement device.

13. The unit according to claim 12, wherein the electrical machine has a shaft connected to the shaft of the internal-combustion engine at a second end of the engine opposite to a first end of the engine connected to the gearbox device.

14. A hybrid powertrain unit for a motor vehicle, comprising:
- an internal-combustion engine; and
- a gearbox device including:
  - at least one primary shaft, that can be connected to a crankshaft of the motor vehicle by means of a clutch device,
  - at least one secondary shaft comprising an axis parallel to and at a distance from an axis of said primary shaft, said at least one secondary shaft carrying an output pinion;
  - a plurality of pairs of gears corresponding to a plurality of forward gear ratios, in which a first gear of each pair is rigidly connected in rotation with respect to a first shaft of said primary and secondary shafts and a second gear of each pair is mounted freely rotatable on a second shaft of said primary and secondary shafts; and
  - a plurality of gear-selection devices for coupling in rotation each of said freely rotatable gears with the second shaft on which is mounted,
- a differential, having a first crown wheel meshing with said output pinion of said secondary shaft of the gearbox device;
- an electrical machine designed to operate both as an electric motor and as an electrical generator and having a casing rigidly connected to a casing of said differential, and a shaft connected by means of a transmission to a second crown wheel of said differential;
- an engagement device set in said transmission for connection between a shaft of the electrical machine and the second crown wheel of the differential;
- an actuator for actuating said engagement device; and
- wherein the electrical machine has a shaft connected to a shaft of the internal-combustion engine at a second end of the engine opposite to a first end of the engine connected to the gearbox device.

15. The unit according to claim 14, wherein the shaft of the electrical machine is connected to the crankshaft by means of a belt transmission including a belt engaged on a first pulley and on a second pulley, which are carried, respectively, by the shaft of the electrical machine and by the shaft of the internal-combustion engine.

16. The unit according to claim 15, further comprising an engagement device set between said first and said shaft of the electrical machine or between said second pulley and the shaft of the internal-combustion engine.

17. A hybrid powertrain unit for a motor vehicle, comprising:
- an internal-combustion engine; and
- a gearbox device including:
  - at least one primary shaft, that can be connected to a crankshaft of the motor vehicle by means of a clutch device,
  - at least one secondary shaft comprising an axis parallel to and at a distance from an axis of said primary shaft, said at least one secondary shaft carrying an output pinion;
  - a plurality of pairs of gears corresponding to a plurality of forward gear ratios, in which a first gear of each pair is rigidly connected in rotation with respect to a first shaft of said primary and secondary shafts and a second gear of each pair is mounted freely rotatable on a second shaft of said primary and secondary shafts;
  - a plurality of gear-selection devices for coupling in rotation each of said freely rotatable gears with the second shaft on which is mounted,
- a differential, having a first crown wheel meshing with said output pinion of said secondary shaft of the gearbox device;
- an electrical machine designed to operate both as an electric motor and as an electrical generator and having a casing rigidly connected to a casing of said differential, and a shaft connected by means of a transmission to a second crown wheel of said differential;
- an engagement device set in said transmission for connection between a shaft of the electrical machine and the second crown wheel of the differential;
- an actuator for actuating said engagement device; and said engagement device being a clutch device, and the actuator means comprising an electromagnetic or electrohydraulic actuator and an electronic unit for controlling said actuator; and the electrical machine having a shaft connected to the shaft of the internal-combustion engine at a second end of the engine opposite to a first end of the engine connected to the gearbox device.

18. A hybrid powertrain unit for a motor vehicle, comprising:

an internal-combustion engine; and a gearbox device including:

at least one primary shaft, that can be connected to a crankshaft of the motor vehicle by means of a clutch device, at least one secondary shaft comprising an axis parallel to and at a distance from an axis of said primary shaft, said at least one secondary shaft carrying an output pinion;

a plurality of pairs of gears corresponding to a plurality of forward gear ratios, in which a first gear of each pair is rigidly connected in rotation with respect to a first shaft of said primary and secondary shafts and a second gear of each pair is mounted freely rotatable on a second shaft of said primary and secondary shafts; and a plurality of gear-selection devices for coupling in rotation each of said freely rotatable gears with the second shaft on which is mounted, a differential, having a first crown wheel meshing with said output pinion of said secondary shaft of the gearbox device;

an electrical machine designed to operate both as an electric motor and as an electrical generator and having a casing rigidly connected to a casing of said differential, and a shaft connected by means of a transmission to a second crown wheel of said differential;

an engagement device set in said transmission for connection between a shaft of the electrical machine and the second crown wheel of the differential;

an actuator for actuating said engagement device; and the electrical machine having a shaft having an axis parallel to and at a distance from the axes of the two output shafts of the differential;

wherein the electrical machine has a shaft connected to the shaft of the internal-combustion engine at a second end of the engine opposite to a first end of the engine connected to the gearbox device.

* * * * *